May 31, 1966 B. R. WANLASS 3,254,163
SIX-WAY SEAT ADJUSTER SWITCH WITH CENTERING MEANS
Filed Dec. 23, 1963 6 Sheets-Sheet 1

INVENTOR.
Bert R. Wanlass
BY C. R. Meland
His Attorney

INVENTOR.
Bert R. Wanlass
BY C. R. Meland
His Attorney

May 31, 1966   B. R. WANLASS   3,254,163
SIX-WAY SEAT ADJUSTER SWITCH WITH CENTERING MEANS
Filed Dec. 23, 1963   6 Sheets-Sheet 4

INVENTOR.
Bert R. Wanlass
BY C. R. Meland
His Attorney

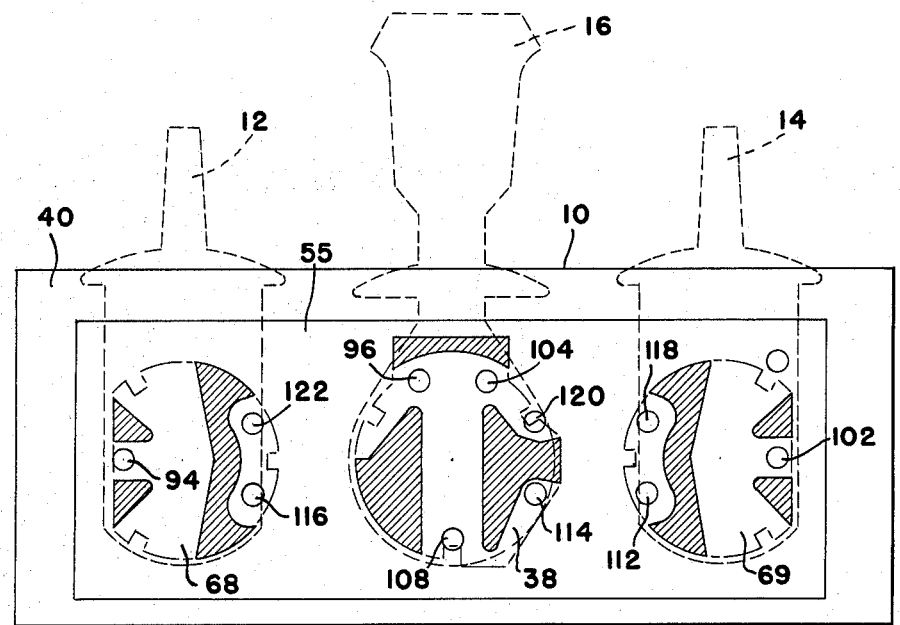
Fig. 8
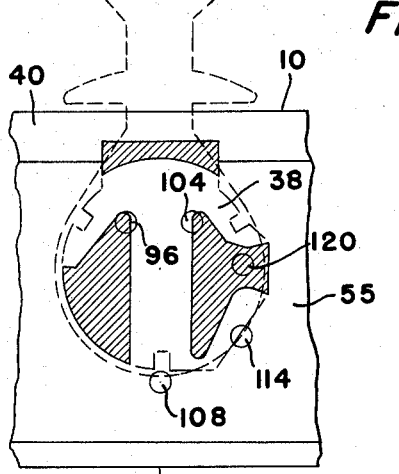
Fig. 10
Fig. 9
INVENTOR.
Bert R. Wanlass
BY C. R. Meland
His Attorney May 31, 1966 B. R. WANLASS 3,254,163
SIX-WAY SEAT ADJUSTER SWITCH WITH CENTERING MEANS
Filed Dec. 23, 1963 6 Sheets-Sheet 6

INVENTOR.
Bert R. Wanlass
BY C. R. Meland
His Attorney

United States Patent Office 3,254,163
Patented May 31, 1966

3,254,163
SIX-WAY SEAT ADJUSTER SWITCH WITH
CENTERING MEANS
Bert R. Wanlass, Warren, Mich., assignor to General Motors Corporation, Detroit, Mich., a corporation of Delaware
Filed Dec. 23, 1963, Ser. No. 332,792
5 Claims. (Cl. 200—6)

This invention relates to electrical switches and more particularly to a type of switch adapted to be mounted on an arm rest of an automobile, said switch being arranged to electrically position an automobile seat substantially in the direction of switch movement.

It is common in the design of switches to position apparatus electrically connected to said switches in the direction of switch movement in order to avoid confusion in the operation thereof. In the prior art, certain types of electrical switches have been designed for use with automobile seats and adapted to be mounted on the side of the seat. However, with the changing design of automobile interiors, it becomes necessary at times to provide a seat adjusting switch that cannot be mounted on the side of the seat. In an application such as this, it may be desirable to mount the switch on the arm rest of an automobile. In this environment, the operator of the automobile may desire to position the seat while the automobile is in motion.

It is an object of the present invention to provide an improved switching device particularly adapted to control the seat movement in automobiles.

It is another object of the present invention to provide an improved electrical switch which includes levers that are mounted to be moved in a direction corresponding to the direction of desired seat movement.

It is still another object of the present invention to provide a seat adjusting switch of improved design that is adapted to be mounted on the arm rest of an automobile.

It is a further object of the present invention to provide a self-centering switch adapted to selectively engage a series of electrical contacts which are in conductive relationship to apparatus arranged to change the position of an automobile seat.

It is still a further object of the present invention to provide an electrical switch that generates a self-wiping action to minimize the oxide build-up on the contacts thereof.

Further objects and advantages of the present invention will be apparent from the following description, reference being had to the accompanying drawings wherein a preferred embodiment of the present invention is clearly shown.

In the drawings:

FIGURE 8 illustrates the relative position of conductive elements of the switch when the automobile seat is in a neutral position;

FIGURE 9 illustrates the relative position of one of the conductive elements relative to a series of contacts with the automobile seat shown in a forward position;

FIGURE 10 illustrates the relative position of one of the conductive elements relative to a series of contacts with the automobile seat shown in elevated position;

Figure 1:
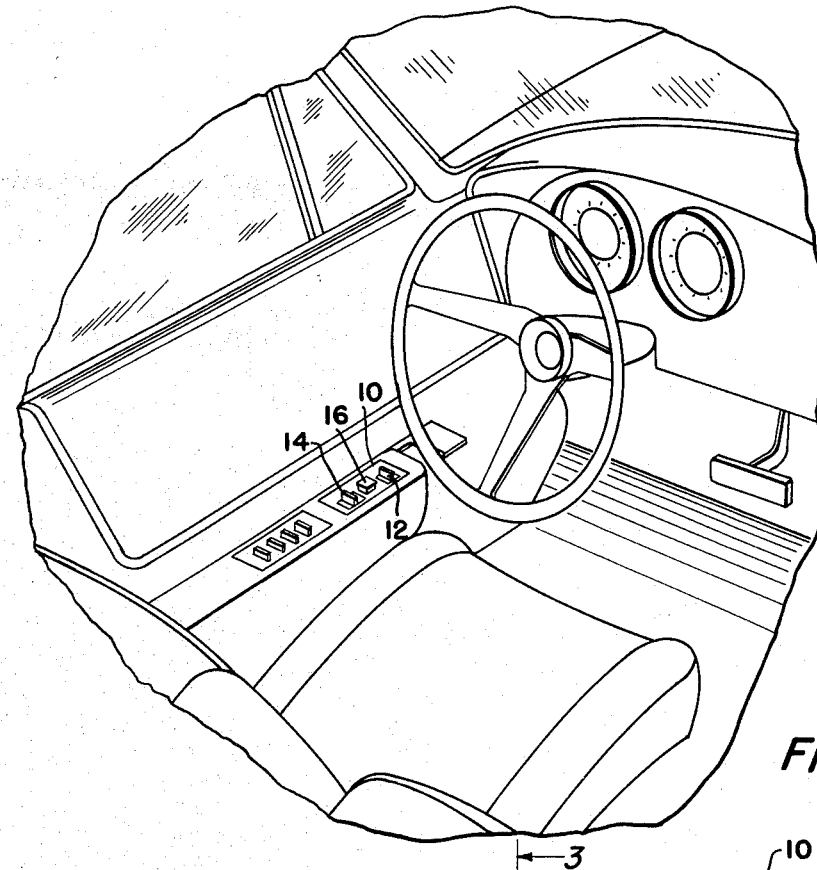
FIGURE 1 is a perspective view of the invention illustrated in a typical operative environment.

Referring now to FIGURE 1, a seat adjuster switch 10 is shown in its operative location on the arm rest in the driving compartment of an automobile.

Figure 2:
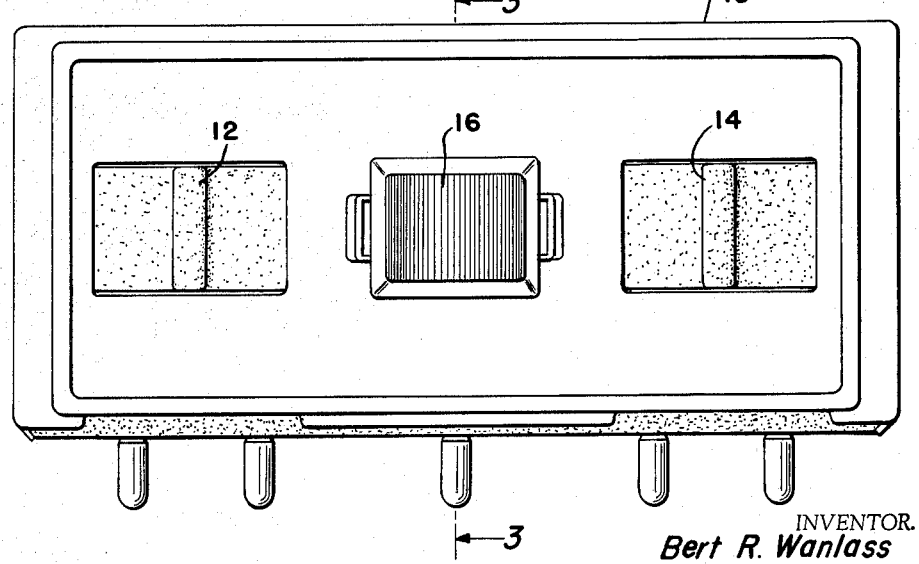
FIGURE 2 is a plan view of the subject invention.

Referring to FIGURE 2, the switch 10 is shown in a plan view with a series of actuators 12 and 14 shown in a neutral position. Normally, these actuators would control the backward and forward tilting movement of an automobile seat. An actuator lever 16 is illustrated in a neutral position and would normally be adapted to control forward and backward movement as well as upward and downward movement of an automobile seat.

Figure 3:
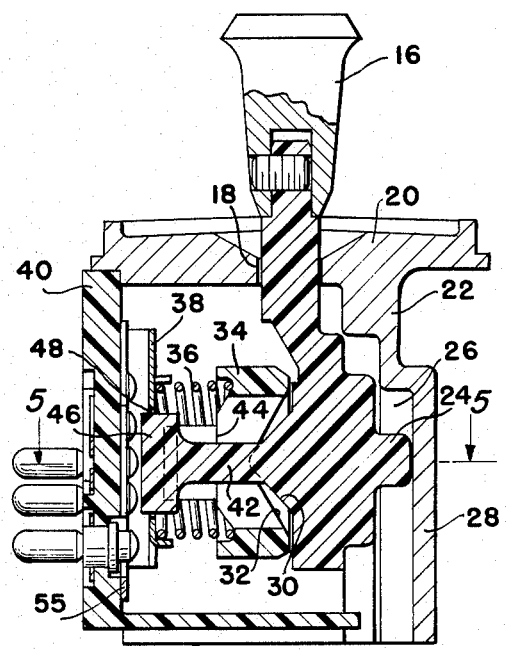
FIGURE 3 is a sectional view taken along line 3—3 of FIGURE 2 illustrating the switch in a neutral position.

Referring to FIGURE 3, the actuator lever 16 is illustrated in its mounted position in an aperture 18 formed in a wall 20 of a switch body 22. The actuator lever 16 has a projection 24 adapted to pivot anywhere along the length of a slot 26 formed in a wall 28 of the switch body 22. The projection 24 serves as a guide for the actuator lever 16 as the actuator lever is moved in a vertical plane as viewed in FIGURE 3. The actuator lever 16 has a cam portion 30 adapted to cooperate with a cam surface 32 formed in a slidable spring retainer 34. A spring 36 is retained on one end by the spring retainer 34 and abuts a contoured conductive member 38 on another end, thereby constantly urging the contoured conductive member 38 into engagement with a wall 40 of the switch body 22. The actuator lever 16 also includes an extending arm 42 which is normally disposed in a slot 44 formed in a wall of the spring retainer 34. The extending arm 42 has an elongated flange 46 adapted to engage a cooperating slot 48 formed in the contoured conductive member 38 to prevent any relative rotation therebetween.

Figure 7:
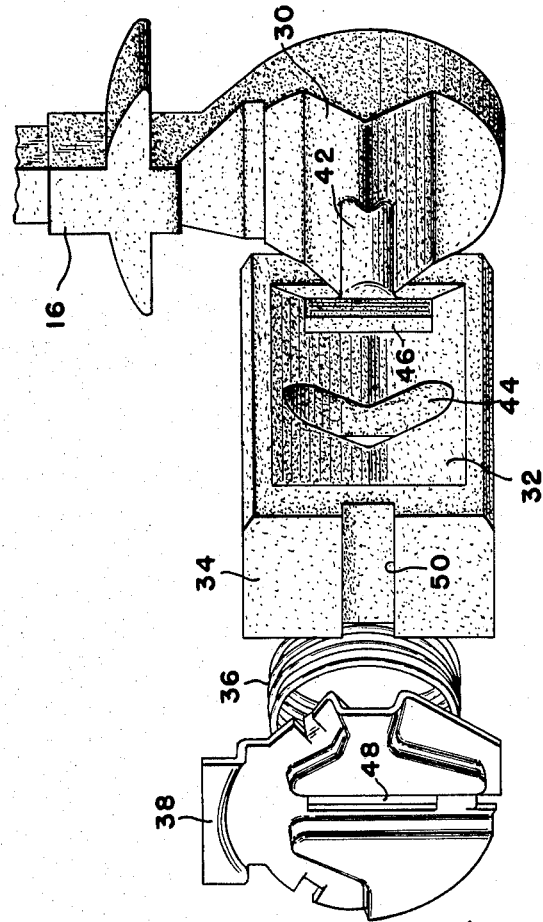
FIGURE 7 is an exploded perspective view of another one of the actuating members of the subject switch.
Figure 7:
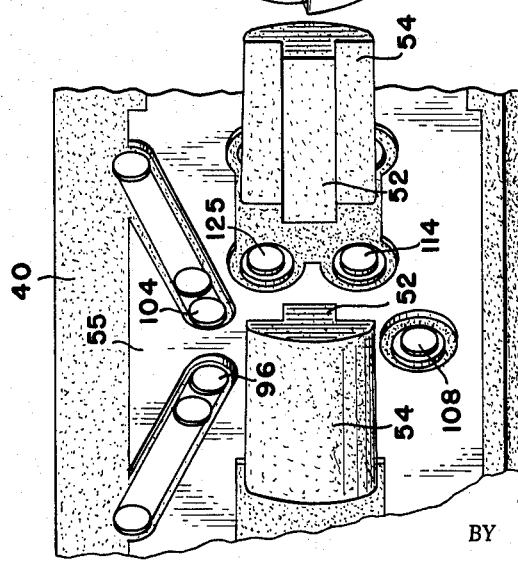

Referring now to FIGURE 7, the actuator lever 16 and the cooperating parts of the switch are shown in a perspective view. The spring retainer 34 is arranged to be a non-rotatable member but is adapted to slide back and forth relative to the wall 40 by means of a pair of grooves 50 formed on a side wall of the spring retainer 34 which cooperate with a pair of guides 52 formed as a portion of extensions 54 of the wall 40. A series of contact heads to be later identified and a conductive plate 55 connected to a power source are disposed on an inside surface of the wall 40. These contacts are insulated with respect to the plate 55 and are adapted to cooperate with a series of contoured portions formed on one surface of the contoured conductive member 38 in a manner to be hereinafter described.

Figure 5:
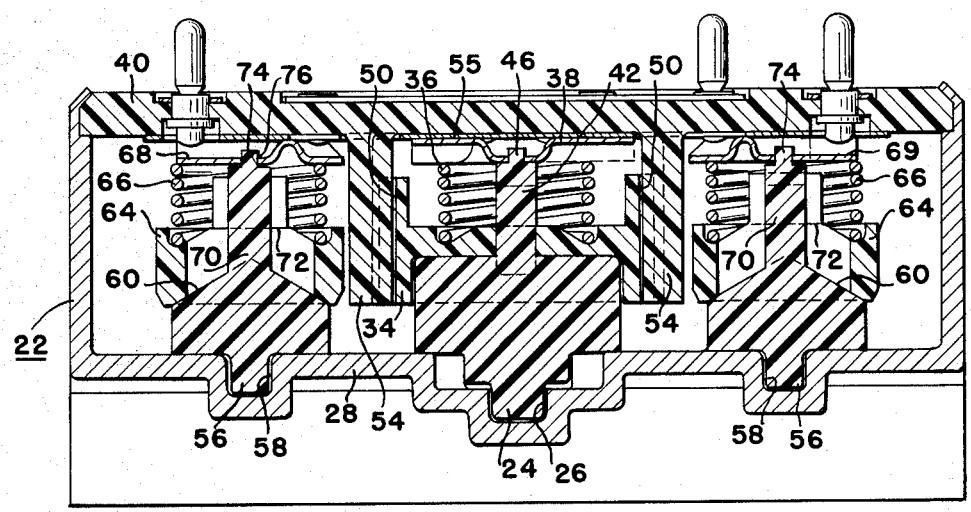
FIGURE 5 is a sectional view taken along line 5—5 of FIGURE 3.

Referring now to FIGURE 5, the actuators 12 and 14 are illustrated in their operative locations relative to the actuator lever 16. It will be understood that the actuators 12 and 14 are of similar design and function in an identical fashion except for the direction of pivotal movement. Their structure is similar to the structure of the actuator lever 16 except that the actuators 12 and 14 are not adapted to be moved vertically. A projection 56 from the actuators 12 and 14 is arranged to cooperate with cup-shaped pockets 58 formed in the wall 28 of the switch body 22. Cam portions 60 are adapted to cooperate with cam surfaces 62 formed in spring retainers 64 to provide a centering means for the actuators 12 and 14 after they are rotated. A spring 66 cooperates with the spring retainer 64 on one end and bears against the surface of a contoured conductive element 68 or 69 on another end. An extension 70 of the actuators 12 and 14 passes through a slot 72 formed in the spring retainers 64 and has an elongated flange 74 arranged to cooperate with a slot 76 formed in the contoured conductive element 68.

Figure 6:
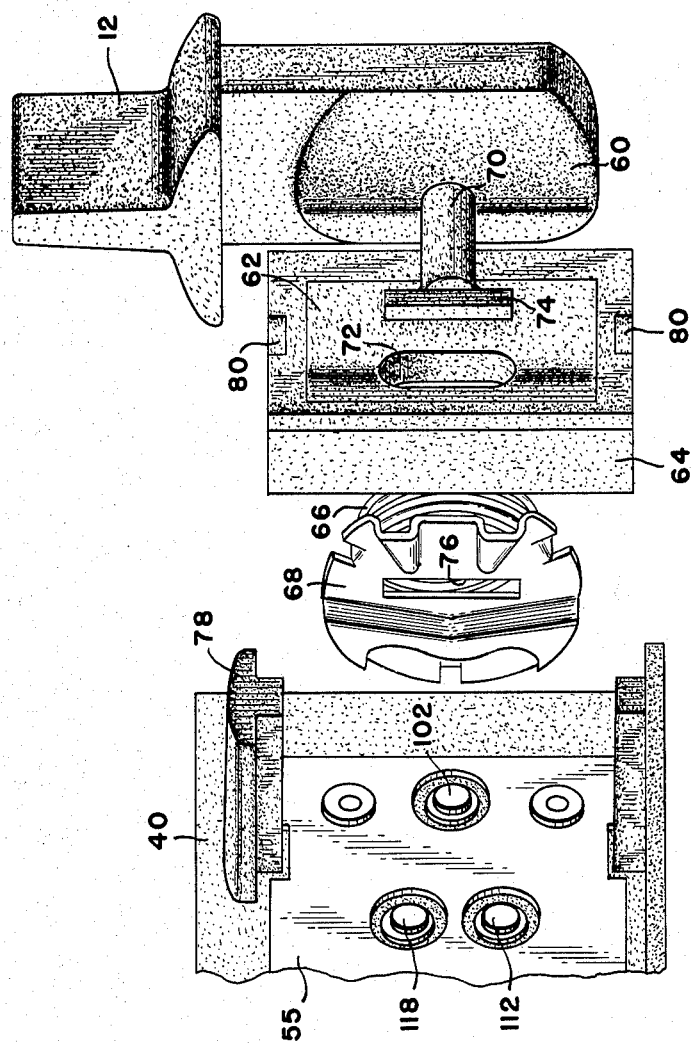
FIGURE 6 is an exploded perspective view of one of the actuating members of the subject switch.

Referring now to FIGURE 6, a typical arrangement of parts is shown which illustrates the structure of the actuators 12 and 14 with their associated elements. A pair of outwardly projecting portions 78 extend from the wall 40 and are arranged to engage a pair of cooperating slots 80 formed on opposite sides of the spring retainers 64. The cooperation of the outwardly projecting portions 78 and the slots 80 are, in effect, a keyway arrangement in which the spring retainers 64 are freely slidable during the coaction of the cam portions 60 of the actuators 12 and 14 and the cam surfaces 62 of the spring retainers 64. The conductive elements 68 and 69 are similar in design and differ only in that the contoured portions are reversed in a mirror-like fashion.

Figure 13:
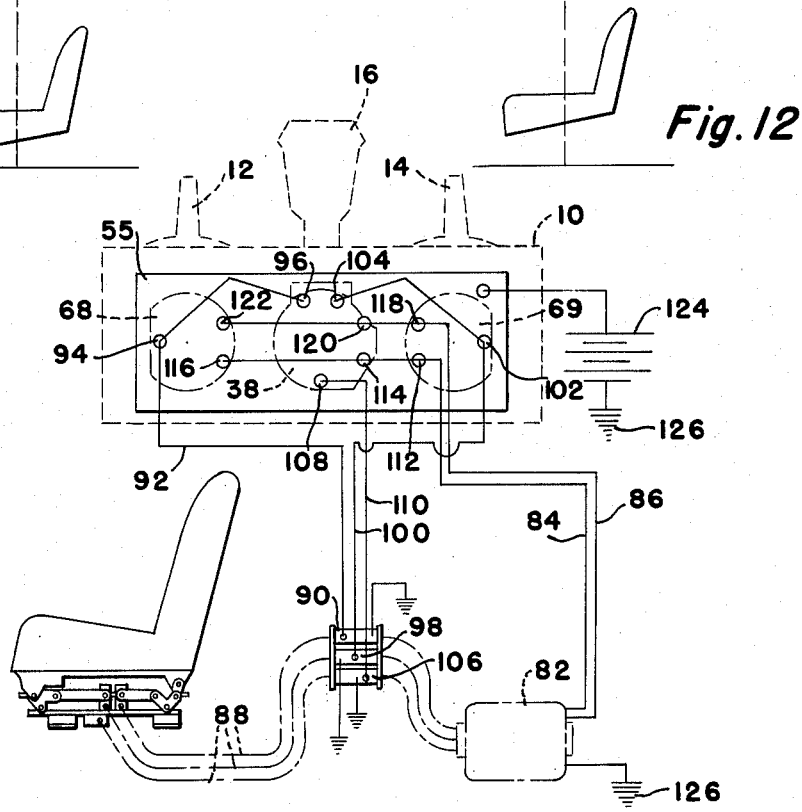
FIGURE 13 is a diagrammatic view of a typical seat adjusting system, electrical leads connected to portions of the switch in a typical fashion.

Referring now to FIGURE 13, the switch 10 is shown in a diagrammatic representation of a typical seat adjusting system. It is understood that the seat adjusting system described herein represents no part of the subject invention except as it cooperates with a switch controlling the operation of said system. The system is generally made up of a reversible electrical motor 82 which is selectively energized through a lead 84 and a lead 86 and a series of jack-screws, not shown, which are driven by flexible drives 88. In a normal installation, there would be three jackscrews, namely a front vertical jackscrew, a rear vertical jackscrew and a horizontal jackscrew. The vertical jackscrews are utilized to position the seat up and down from a central reference line and are utilized separately to bring about a tilting movement of the front of the seat and the rear of the seat as measured from the hypothetical average reference line. Hereinafter, these movements will be referred to as tilt front and tilt back, respectively. In addition to the aforementioned movements, a fifth and sixth type of movement is brought about by an actuation of the horizontal jackscrew which positions the seat forward and to the rear of an established reference line.

Any one of the flexible drive lines 88 to the described jackscrews are selectively connected to the reversible motor 82 by a series of solenoid-positioned couplers. A solenoid 90 positions a drive line 88 which engages the front vertical jackscrew to the reversible motor 82. It is seen that, depending on the direction of rotation of the motor 82, the front vertical jackscrew will cause the front of the automobile seat to go up or down. A lead 92 is in conductive relationship with the contact 94 and a contact 96 which are appropriately positioned through the wall 40 of the switch 10. A solenoid 98 controls the movement fo a coupling mechanism to the flexible drive 88 from a rear vertical jackscrew to the reversible motor 82. A lead 100 establishes a conductive relationship between the solenoid 98 and a contact 102 and a contact 104. A solenoid 106 controlling the connection of a flexible drive 88 from a horizontal jackscrew to the reversible motor 82 is in electrical and conductive relationship to a contact 108 through a lead 110.

The lead 84 from the motor 82 is connected with contacts 112, 114 and 116 in much the same manner as the solenoid contacts are connected to the leads 92, 100 and 110. The contacts 112, 114 and 116 are contained on one surface of the wall 40 and are adapted to be selectively engaged by any one of the contoured conductive members 38, 68 or 69, thereby causing a rotation of the reversible motor 82 in a given direction. The contacts 118, 120 and 122 are in conductive relationship with the reversible motor 82 through the lead 86 thereby establishing a direction of rotation of the motor 82 in an opposite direction. A power source, such as a battery 124, is connected between a ground 126 and the conductive plate 55 thereby providing electrical power for the reversible motor and for operation of the solenoids.

It should be noted, in view of the foregoing, that any actuation of the switch must necessarily involve an actuation of any of the motor contacts 112 through 122 in order to energize the motor 82 in a given direction. At the same time, any switch actuation involving a seat movement must also energize one of the solenoids which connects any of the three flexible drive lines 88 to the motor 82. Consequently, with the arrangement described, it is possible to bring about a seat movement in six different directions and the manner of accomplishing the same will be hereinafter described.

Referring to FIGURE 8, the switch 10 is shown in phantom with the portions of the contoured conductive members 38, 68 and 69 shown in section in order to more clearly appreciate the operation of the switch. It is therefore possible to visualize a movement of the sectioned portions of the conductive elements 38, 68 and 69 in a direction which will engage the contacts shown in a plan view in a position where they would be normally covered by overlying contoured portions of the conductive members 38, 68 and 69. It is understood that the portions of the conductive members 38, 68 and 69, shown in section in FIGURE 8 and in FIGURES 9, 10, 11 and 12, are located substantially on the same plane as the contacts also shown in these figures and some portion of the conductive members 38, 68 and 69 always engages the plate 55. Therefore, it is understood that, due to the relative position of the conductive elements 38, 68 and 69 to the contacts, as viewed in FIGURE 8, the switch 10 is shown in the neutral position in that none of the contacts are engaged by any portions of the contoured elements 38, 68 or 69.

Figure 4:
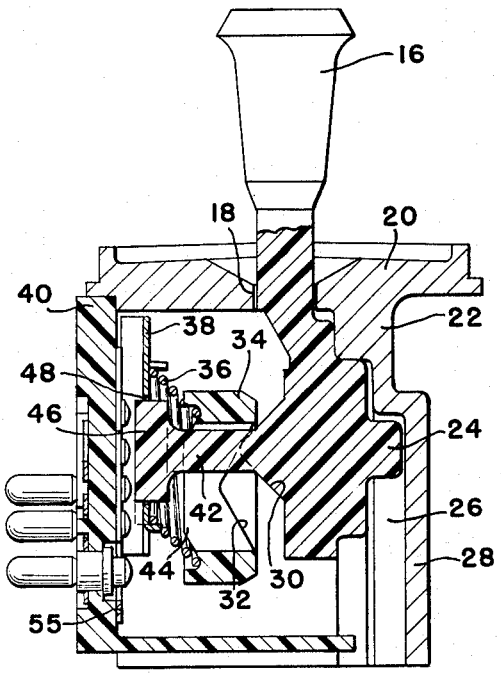
FIGURE 4 is a sectional view taken along line 3—3 of FIGURE 2 illustrating the subject switch in an actuated position.

In operation, if it is desired to move the automobile seat upward from the neutral reference as established in FIGURE 8, the actuator lever 16 would be pulled up into a position as illustrated by the phantom lines in FIGURE 10. Due to the engagement of the contoured conductive member 38 to the actuator lever 16 as previously described and illustrated in FIGURE 4, the movement of the lever 16 results in a corresponding movement of the contoured conductive member 38 along the inside face of the wall 40. Referring to FIGURE 10, it is seen that the conductive element 38 has engaged the contacts 96, 104 and 120 while maintaining engagement with the plate 55. As previously described and illustrated in FIGURE 13, an engagement of the contact 120 will result in the energization of the reversible motor 82 and cause it to be driven in a given direction. Contemporaneous thereto, the engagement of the contacts 96 and 104 will result in a connection of the flexible drive lines 88 to the motor 82 from the front and rear vertical jackscrews thereby causing the seat to be raised. This is due to the energization of solenoids 90 and 98. As pressure is released from the actuator lever 16, a centering action resulting from the cooperation of the cam portion 30 of the actuator 16 and the cam surface 32 of the spring retainer 34 will result. This centering action is more clearly seen in FIGURE 4 where the actuator lever 16 has returned essentially to the position illustrated in FIGURE 8. Thereafter, the seat will remain in its newly established position until acted upon by movement of the actuator lever 16 in a downward direction relative to the wall 20 of the switch 10. Such an action would result in the reengagement of the contacts 96 and 104. This results in a connection of the drive lines to the front and rear vertical jackscrews, and the movement of the member 38 would result in an engagement of the contact 114 which would result in a rotation of the reversible motor 82 in an opposite direction. It is thus clear that downward movement of the actuator 16 would result in the movement of the motor 82 in the opposite direction bringing about a reversal of the seat positioning just described.

If it is desired to move the seat from its relative position as viewed in FIGURE 8 to a forward position, the action is initiated by a tilting of the actuator lever 16 in a counterclockwise direction as viewed in FIGURE 8. This tilting movement is more clearly seen in FIGURE 9 wherein the conductive member 38 has engaged the contact 108 and the contact 120. The engagement of the contact 120 results in the energization of the motor 82 in the given direction and the engagement of the contact 108 results in the connection of one of the drive lines 88 to the horizontal jackscrew by the solenoid 106. The seat will assume the new position along the reference plane as seen in FIGURE 9 and a releasing of the pressure from the actuator lever 16 will result in its being repositioned according to the configuration as viewed in FIGURE 8 by the cooperation of the cam portions 30 of the actuator 16 and the cam surface 32 of the spring retainer 34. The perspective view in FIGURE 7 more clearly points out the manner in which the centering action takes place. It is understood that a tilting of the actuator lever 16 in a clockwise direction from its position as seen in FIGURE 8 would result in the reengagement of the contact 108 by the contoured conductive member 38 and an engagement of the contact 114, the engagement of the contact 120 being broken. Therefore, it becomes apparent that the sequence just described is reversed in that the drive line to the horizontal jackscrew is reestablished to the motor 82 but the direction of the rotation of the motor 82 has been changed by an engagement of the contact 114.

If it is desired to tilt the automobile seat in a forward direction, the result can be accomplished in either of two ways depending on the requirement of the vehicle operator. It would be possible to activate the forward vertical jackscrew to the automobile seat in a manner which would draw the forward portion of the seat downward, the rear portion remaining fixed. It would also be possible to activate the rear vertical jackscrew of the seat in a manner which would drive the rear portion of the seat upward, the front portion of the seat remaining stationary. It is understood that only one of the aforementioned methods of tilting the seat could be used at one time due to the necessity of activating both of the vertical jackscrews in a manner requiring a different direction of rotation of the motor 82. Therefore, an example of operation will involve a tilting of the seat in a forward direction by means of driving the front vertical jackscrew downwardly.

Figures 11, 12:
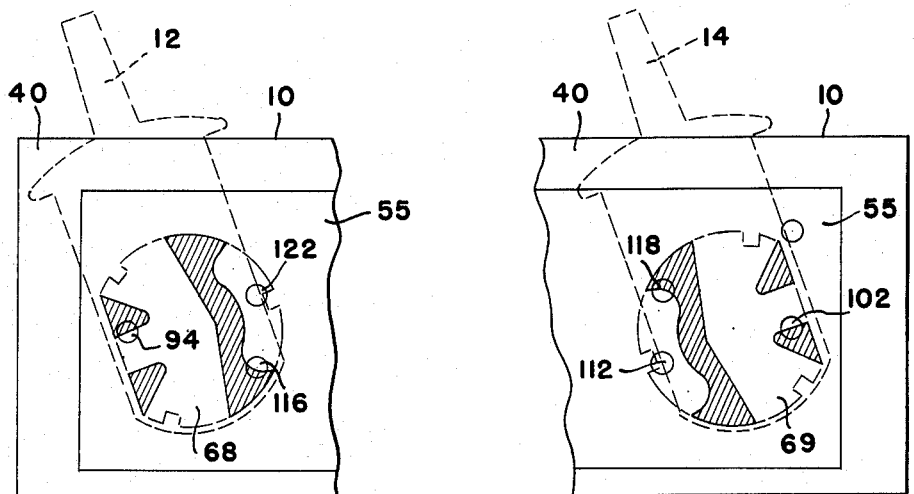
FIGURE 11 illustrates the relative position of one of the conductive elements relative to a series of contacts with the automobile seat shown tilted forward.
FIGURE 12 illustrates the relative position of one of the conductive elements relative to a series of contacts with the automobile seat shown tilted forward.

Referring to FIGURE 11, the aforementioned result is brought about by a tilting of the actuator 12 in a counterclockwise direction as view in FIGURE 11. It is seen in FIGURE 11 that, as the actuator 12 is tilted in a counterclockwise manner, the contoured conductive element 68 associated with the actuator 12 engages the contact 94 and the contact 116 while maintaining contact with the plate 55. As diagrammatically shown in FIGURE 13, the contact 116 controls the direction of motor rotation and the contact 94 causes the solenoid 90 to connect the front vertical jackscrew to the motor 82. This will result in the jackscrew being driven downwardly, thereby drawing the front portion of the seat in a downward direction relative to the reference line established in FIGURE 11. As pressure is released from the actuator 12, the actuator 12 is caused to be centered to the position generally shown in FIGURE 8 by means of the cooperation of the cam portion 60 of the actuator 12 and the cam surfaces 62 of the spring retainer 64 as best seen in FIGURE 6. It is obvious that the tilting of the actuator 12 in a clockwise direction as viewed in FIGURE 11 will result in a movement of the forward portion of the seat in the opposite direction in view of the fact that the contact 94 is reengaged and the contact 122 is engaged, the engagement with contact 116 being broken. It is apparent that the front vertical jackscrew is again positioned to the motor through the drive line 88 with the motor 82, but the motor 82 is now rotating in the opposite direction.

FIGURE 12 illustrates the positioning of the seat in a tilting fashion by the actuation of the rear vertical jackscrew with the front vertical jackscrew being held in a static position. The cooperation of the contacts 102, 112 and 118 with the conductive element 69 is much the same as that described for the operation of the front vertical jackscrew. The only basic change in the operation is that the contoured portions of the conductive element 69 in this case are reversed as is the relative position of the contacts 102, 112 and 118.

Utility of the present invention is immediately apparent when used in an environment where the positioning of electrical apparatus in a given direction corresponds to the direction of movement of switch actuating elements. It is understood that the utilization of the present invention for a seat positioning operation is illustrative in nature and that the switch would function equally as well in some other environment. Also, it is understood that the positioning of an automobile seat from a switch mounting located on the arm rest of an automobile brings about special mechanical problems not present when the seat adjuster or switch is positioned on the side of an automobile seat.

While the embodiment of the present invention, as herein disclosed, constitutes a preferred form, it is to be understood that other forms might be adopted.

What is claimed is as follows:

1. The combination of an automobile seat adjusting mechanism and an electric switch for controlling the automobile seat adjusting mechanism, said seat adjusting mechanism including a seat movable by a series of jackscrews selectively engageable with a reversible electric motor by electrically energized solenoids, said switch comprising: a switch housing having an aperture in one wall and an elongated slot in a wall perpendicular thereto, plural actuator means, at least one of said actuator means being pivotally supported in said elongated slot and translationally movable in said aperture, said actuator means having lever portions extending to the exterior thereof, said lever portions movable in a direction corresponding to desired seat movement; fixed contact means carried on one wall of said housing, at least one of said fixed contacts conductively engaging an electric power source, several of said fixed contacts conductively engaging the solenoids, and at least one fixed contact conductively engaging the electric motor; movable contact means responsive to movement of said actuator means to selectively bridge selected fixed contacts for energizing the seat adjusting mechanism; and biasing means interposed between a portion of said actuator means and said movable contact means to maintain said movable contact means in biased sliding engagement with the switch body carrying said fixed contacts and for urging said actuator means to a centered poised position.

2. The combination according to claim 1 wherein said actuator means includes opposed cam portions operatively interlocked and biased by said biasing means for returning said actuator means to a center poised position when said cam portions are twisted from an interlocked mated position.

3. The combination according to claim 1 wherein said movable contact means has irregularly shaped contoured portions adjacent the series of fixed contact means for selectively engaging said fixed contact means as said actuator means is moved during an adjusting movement of the slot adjusting mechanism.

4. The combination according to claim 1 wherein said actuator means is a plurality of pivotable levers extending from the switch housing and including pivot portions slidably carried along an inside wall of said housing, at least one of said actuator means being axially movable to bring about a seat adjustment in the vertical plane and pivotable through the plane of the axial movement to bring about a corresponding seat movement in that plane, said actuator means being laterally restrained against movement in a plane perpendicular to said first mentioned plane.

5. The combination according to claim 1 wherein said movable contact means are operatively located on an extension of said actuator means being biased against said fixed contact means by said biasing means, said actuator means including a spring retainer having cam portions cooperating with complementary shaped cam portions carried by another portion of said actuator means to effect a centering of said actuator means relative to said elongated slot after pivotal or axial movement of said actuator means has been completed and a force is removed from the portion of said actuator means extending to the exterior of said housing.

References Cited by the Examiner
UNITED STATES PATENTS

| | | | |
|---|---|---|---|
| 2,814,678 | 11/1957 | McFarland | 200—153 X |
| 2,909,624 | 10/1959 | Colautti | 200—6 |
| 2,919,315 | 12/1959 | Woofter | 200—16 |
| 2,941,048 | 6/1960 | Lybrook et al. | 200—6 |
| 2,966,559 | 12/1960 | Meyer | 200—6 |
| 3,106,619 | 10/1963 | Scheid | 200—16 |
| 3,135,839 | 6/1964 | Colautti et al. | 200—5 |

KATHLEEN H. CLAFFY, *Primary Examiner.*

JAMES R. SCOTT, *Assistant Examiner.*